(12) United States Patent
Westphall et al.

(10) Patent No.: US 11,728,146 B2
(45) Date of Patent: Aug. 15, 2023

(54) RETRACTABLE ION GUIDE, GRID HOLDER, AND TECHNOLOGY FOR REMOVAL OF CRYOGENIC SAMPLE FROM VACUUM

(71) Applicant: Wisconsin Alumni Research Foundation, Madison, WI (US)

(72) Inventors: Michael Scott Westphall, Fitchburg, WI (US); Joshua Jacques Coon, Middleton, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 14 days.

(21) Appl. No.: 17/575,135

(22) Filed: Jan. 13, 2022

(65) Prior Publication Data

US 2022/0223394 A1 Jul. 14, 2022

Related U.S. Application Data

(60) Provisional application No. 63/136,857, filed on Jan. 13, 2021.

(51) Int. Cl.
*G01N 1/42* (2006.01)
*H01J 49/04* (2006.01)
(Continued)

(52) U.S. Cl.
CPC ............ *H01J 49/0004* (2013.01); *G01N 1/42* (2013.01); *H01J 49/04* (2013.01); *H01J 49/0468* (2013.01);
(Continued)

(58) Field of Classification Search
CPC .............. H01J 49/0004; H01J 49/0486; H01J 49/0495; H01J 49/062; H01J 49/04; H01J 49/0468; H01J 2237/2007; G01N 1/42
(Continued)

(56) References Cited

U.S. PATENT DOCUMENTS 8,754,384 B1 * 6/2014 Persoon .................. H01J 37/20
250/306
8,796,646 B2 * 8/2014 Mulders .................. C23C 16/26
250/306

(Continued)

FOREIGN PATENT DOCUMENTS

CN 1590086 A 3/2005
CN 102404927 A 4/2012
(Continued)

OTHER PUBLICATIONS

Blake et al. (2004) "Preparative Linear Ion Trap Mass Spectrometer for Separation and Collection of Purified Proteins and Peptides in Arrays Using Ion Soft Landing," Analytical Chemistry 76(21):6293-6305.

(Continued)

*Primary Examiner* — Kiet T Nguyen
(74) *Attorney, Agent, or Firm* — Leydig, Voit & Mayer, Ltd.

(57) ABSTRACT

Imaging by cryo-electron microscopy (cryo-EM) requires that a sample be encased in an amorphous solid, such as amorphous ice. In current cryo-EM preparation systems, once the sample has been deposited on an EM grid and coated in the amorphous solid, the EM grid must be removed from vacuum and then transferred into the vacuum of the cryo-EM system. As a result, samples deposited on the grid are exposed to damage and contamination. The present invention provides improved EM grid handling systems and devices compatible with advanced cryo-EM sample preparation techniques and which reduce or eliminate exposure of the sample on the grid to atmosphere and elevated temperatures. These methods and devices will also significantly reduce handling time and complexities associated with cryo-EM sample preparation.

20 Claims, 4 Drawing Sheets

(51) Int. Cl.
 *H01J 49/00* (2006.01)
 *H01J 49/06* (2006.01)
(52) U.S. Cl.
 CPC ...... *H01J 49/0486* (2013.01); *H01J 49/0495* (2013.01); *H01J 49/062* (2013.01)
(58) Field of Classification Search
 USPC .......................................... 250/311, 281, 282
 See application file for complete search history.

(56) References Cited

U.S. PATENT DOCUMENTS

| | | | |
|---|---|---|---|
| 11,092,523 | B2 | 8/2021 | Coon et al. |
| 11,525,760 | B2 | 12/2022 | Coon et al. |
| 2006/0262317 | A1 | 11/2006 | Doak et al. |
| 2011/0027876 | A1 | 2/2011 | Lihl et al. |
| 2012/0003394 | A1 | 1/2012 | Mulders et al. |
| 2012/0241607 | A1 | 9/2012 | Bose et al. |
| 2013/0037706 | A1* | 2/2013 | Ditto ............... H01J 37/20 250/307 |
| 2013/0205808 | A1 | 8/2013 | Mulders et al. |
| 2013/0288182 | A1 | 10/2013 | Branton et al. |
| 2014/0166880 | A1 | 6/2014 | Shiue et al. |
| 2014/0360286 | A1 | 12/2014 | Carragher et al. |
| 2016/0189919 | A1 | 6/2016 | Passmore et al. |
| 2016/0245732 | A1 | 8/2016 | Rémigy |
| 2016/0351374 | A1 | 12/2016 | Wang |
| 2020/0158607 | A1 | 5/2020 | Coon et al. |
| 2022/0065761 | A1 | 3/2022 | Coon et al. |

FOREIGN PATENT DOCUMENTS

| | | |
|---|---|---|
| CN | 105531792 A | 4/2016 |
| GB | 913433 | 9/2009 |
| JP | 2008-538235 A | 10/2008 |
| JP | 2013-164419 A | 8/2013 |
| JP | 2014-522478 A | 9/2014 |
| TW | 201231948 A | 8/2012 |
| WO | WO 2011/012844 A1 | 2/2011 |
| WO | WO 2019/010436 | 1/2019 |
| WO | WO 2022/155306 | 7/2022 |

OTHER PUBLICATIONS

Bonislawski (May 2017) "Thermo Fisher Targets Structural Biology Space With Mass Spec, Cryo-EM Offerings," GenomeWeb, 3 pp.
Boyarkin et al. (2014) "Cryogenically cooled octupole ion trap for spectroscopy of biomolecular ions," Review of Scientific Instruments, 85, 033105.
Cheng et al. (2015) "A Primer to Single-Particle Cryo-Electron Microscopy," Cell 161(3):438-449.
Chinese First Office Action dated Oct. 11, 2021 in Chinese Application No. 201880040096.
Chinese Search Report dated Sep. 28, 2021 in Chinese Application No. 201880040096, 3 pp.
Cleeves et al. (2014) "The ancient heritage of water ice in the solar system," Science 345(6204): 1590-1593.
Dohnalek et al. (2003) "The deposition angle-dependent density of amorphous solid water films," Journal of Chemical Physics 118(1): 364-372.
Extended European Search Report, dated Feb. 11, 2021, corresponding to European Patent Application No. 18828718.9, 8 pages.
Fama et al. (2008) "Sputtering of ice by low-energy ions," Surface Science 602(1): 156-161.
Glaeser (Jan. 2016) "How good can cryo-EM become?," Nature Methods 13(1):28-32.
Guillot et al. (2004) "Investigation of vapor-deposited amorphous ice and irradiated ice by molecular dynamics simulation," J. Chemical Physics 120(9):4366-4382.
Gutzler et al. (2010) "Combination of a Knudsen effusion cell with a quartz crystal microbalance: In situ measurement of molecular evaporation rates with a fully functional deposition source," Review of Scientific Instruments 81(1): 015108-1-015108-4.
Huffstetler et al. (2001) "Resistively heated molecular beam doser for water deposition in ultrahigh vacuum," Journal of Vacuum Science & Technology a—Vacuum Surfaces and Films 19(3):1030-1031.
International Preliminary Report on Patentability, dated Jan. 16, 2020, corresponding to International Application No. PCT/US2018/041120 (filed Jul. 6, 2018), 7 pp.
International Search Report and Written Opinion, dated Oct. 1, 2018, corresponding to International Application No. PCT/US2018/041120 (filed Jul. 6, 2018), 9 pp.
Japanese Search Report dated Feb. 17, 2022 in Japanese Application No. 2019-565506.
Mastrapa et al. (2008) "Optical constants of amorphous and crystalline H2O-ice in the near infrared from 1.1 to 2.6 μm," Icarus 197(1):307-320.
Mishima et al. (1998) "The relationship between liquid, supercooled and glassy water," Nature 396(6709): 329-335.
Moeller et al. (2012) "Measurement of the accumulation of water ice on optical components in cryogenic vacuum environments," Optical Engineering 51(11): 115601-1-115601-8.
Seo et al. (Nov. 2016) "Retention of Native Protein Structures in the Absence of Solvent: A Coupled Ion Mobility and Spectroscopic Study," Angewandte Chemie-International Edition 55(45): 14173-14176.
Stark et al. (Feb. 2016) "Sample preparation of biological macromolecular assemblies for the determination of high-resolution structures by cryo-electron microscopy," Microscopy 65(1):23-34.
Thompson et al. (May 2016) "An introduction to sample preparation and imaging by cryo-electron microscopy for structural biology," Methods 100: 3-15.
Wall (2016) "Preparation of cold molecules for high-precision measurements," Journal of Physics B-Atomic Molecular and Optical Physics, 49, 243001, 37 pp.
Westley et al. (1998) "Density and index of refraction of water ice films vapor deposited at low temperatures," J. Chemical Physics 108(8):3321-3326.
Yu et al. (2014) "Single-step antibody-based affinity cryo-electron microscopy for imaging and structural analysis of macromolecular assemblies," J. Structural biology 187(1):1-9.
Zallen (1983) The Physics of Amorphous Solids, Wiley-VCH, Germany: 8-10.

* cited by examiner

RETRACTABLE ION GUIDE, GRID HOLDER, AND TECHNOLOGY FOR REMOVAL OF CRYOGENIC SAMPLE FROM VACUUM

CROSS-REFERENCE TO RELATED APPLICATIONS

This application claims the benefit of priority to U.S. Provisional Patent Application No. 63/136,857, filed Jan. 13, 2021, which is specifically incorporated by reference to the extent not inconsistent herewith.

STATEMENT REGARDING FEDERALLY SPONSORED RESEARCH

This invention was made with government support under GM118110 awarded by the National Institutes of Health. The government has certain rights in the invention.

BACKGROUND OF THE INVENTION

Mass spectrometry (MS) technologies are currently used to analyze, en masse, protein abundance, modification state, interaction partners, and even biochemical pathways in which proteins function. Native MS gently ionizes protein complexes using electrospray under conditions that preserve protein structure. Extremely accurate mass measurement of these mega-Dalton protein complexes allows for calculation of sub-unit stoichiometry and even identification of non-covalently bound small molecules.

Further tools for gaining structural information using MS technologies include ion mobility, chemical cross-linking, covalent labeling, and dissociation technologies such as surface-induced dissociation (SID). This collection of MS techniques is increasingly recognized as both critical for complete structural characterization and complementary to the emergent field of cryo-electron microscopy (cryo-EM). Capable of imaging protein and other biomolecule particles in the native state, single-particle cryo-EM allows proteins and other biomolecules to be examined in three-dimensional images that reveal their orientations in high detail. This technique has accelerated the rate and ease with protein structure is determined—a feat that earned its early pioneers the 2017 Nobel Prize in Chemistry.

Thus, single particle cryo-EM is a powerful tool for structural studies of eukaryotic cells, proteins (>150 kDa), and macromolecular complexes (e.g., liposomes, organelles, and viruses) (Stark et al., Microscopy, 2016, 65(1):23-34)). However, for cryoEM imaging to be successful, the purified sample must be fixed in an amorphous (i.e., vitreous) solid, such as amorphous ice. Typically, purified biomolecule complexes are spotted onto a transmission electron microscope (TEM) grid in an aqueous solution, the excess solution is blotted off (also removing approximately 99% of the sample), and the entire grid is plunged into a liquid cryogen in order to vitrifying the remaining solution/sample. The idea is to vitrify the biomolecule complex in a layer of amorphous ice (or another amorphous solid) just a few nanometers thicker than the complex itself. Unlike crystalline ice, this coat of amorphous ice is transparent to the electron beams used in EM, protects the particles from radiation and, when thin as possible, can enable increased contrast for a sharper structural image.

Unfortunately, currently existing sample preparation techniques impart a non-random orientation of the particles (due largely to particle migration to the air/water interface), and the particles often become deformed/stretched at the air-water interface, thereby destroying the required structural heterogeneity. Similar deformations arise from the absorption of the sample to the EM grid substrate and subsequent handling of the EM grid.

Another requirement of an ideally vitrified cryo-EM specimen is to have a high density of randomly oriented identical molecules located within a hole of the EM grid. However, this imposes a significant problem as the majority of the sample gets removed during the blotting process during conventional preparation techniques. As a result, these samples yield only a very few particles per grid hole. However, even at the highest concentrations very few particles are observed per grid hole, as they preferentially absorb to the EM-grid, leaving the holes less occupied. Second, formation of ice in conventional methods causes the ice at the center of a hole in the grid to be thinner than the ice near the edges, forcing the particles to the outer edges. This process can also impart a preferred orientation, especially if the molecules are thicker in one dimension than another. With only a few analyte particles per hole, data acquisition times must be extended and data files become very large (i.e., greater than 5 Tb), since much of the EM grid must be imaged to generate sufficient signal for analysis. Beyond limiting the scope and types of proteins that can be analyzed, conventional approaches puts a significant strain on the computational resources required to analyze the data (Cheng et al., Cell, 2015, 161(3):438-449)).

A method, termed biomolecular vapor deposition (BVD), for generating improved cryo-EM samples has been developed by the present inventors. A number of embodiments utilizing BVD is described in WO 2019/010436. Preferably utilizing a mass spectrometer, BVD mitigates many of the shortfalls associated with cryogenically fixing biological samples in amorphous ice for analysis by cryo-EM. However, the physical systems used to prepare samples in current BVD and other conventional methods are not directly connected to a cryo-EM system. As a result, after preparing the sample-containing TEM grids, the grid must be removed from vacuum and transferred to the cryo-EM system. Removing the grids from vacuum and exposing the grids to atmospheric conditions without damaging or contaminating the sample is extremely difficult due to the inherent delicacy of the prepared grids.

To address this issue and minimize sample loss, the present invention provides an improved grid holder and EM grid handling system, compatible with BVD and similar advanced sample preparation methods.

SUMMARY OF THE INVENTION

The present invention provides improved EM grid handling systems and devices compatible with advanced cryo-EM sample preparation techniques and which reduce or eliminate exposure of the sample grid to atmosphere and elevated temperatures during sample preparation, handling and transport. The methods and devices of the present invention provide additional protection to the EM sample and will also significantly reduce handling time and complexities related to storing and transporting samples. This will also increase the number of samples that are able to be successfully analyzed via cryo-EM by minimizing sample loss.

In general, cryo-EM samples are typically prepared by cooling analyte particles to very low temperatures prior to depositing the particles onto a cooled substrate surface, such as a transmission electron microscope (TEM) grid. The analyte particles are further contacted with a vapor stream of atoms or molecules at cryogenic or near cryogenic temperatures (i.e., a temperature of −90° C. or less), preferably under a vacuum. As a result, a thin layer of an amorphous solid is formed around each particle without significant conformational changes in the particle structure, thereby forming a sample for EM analysis.

In one aspect, the present invention is designed for TEM sample grids that allow for in vacuo preparation of cryo-EM samples. The device is able to maintain the grid at a cryogenic or near cryogenic temperatures and transfer the grid from the deposition chamber into a cooled storage container at atmospheric pressure.

In an embodiment, the present invention provides a cryo-electron microscopy (cryo-EM) sample preparation system comprising: a) a sample vacuum chamber; b) a sample holder positioned within the sample vacuum chamber, wherein the sample holder comprises a receiving surface; c) a temperature control means able to provide a temperature of −100° C. or less to the receiving surface of the sample holder; d) an ion or particle generator having an internal pressure, wherein the ion or particle generator is able to produce a controllable analyte beam containing charged or uncharged analyte particles and direct the analyte beam to contact the receiving surface of the sample holder, thereby depositing analyte particles onto the receiving surface; and e) a beam doser able to produce a controllable vapor stream and direct said vapor stream to contact the receiving surface of the sample holder, wherein the vapor stream generates an amorphous solid, and wherein the sample vacuum chamber is able to be isolated from the ion or particle generator and produce an internal pressure different from the internal pressure of the ion or particle generator.

During the deposition process, the internal pressure of the sample vacuum chamber is reduced to a pressure of $10^{-4}$ Torr or less, a pressure of $10^{-5}$ Torr or less, or a pressure $10^{-6}$ Torr or less. The ion or particle generator is operated at a pressure that is independent from the pressure of the sample vacuum chamber, typically a pressure of $10^{-3}$ Torr or less, a pressure of $10^{-4}$ Torr or less, a pressure of $10^{-5}$ Torr or less, or a pressure $10^{-6}$ Torr or less.

The ion or particle generator can be any device able to generate and transmit charged and uncharged particles, including but not limited to mass spectrometer devices and other devices able to be used as an electrospray deposition source. In an embodiment, the desired particles can be isolated or purified using the mass spectrometer prior to generating the cryo-EM sample. Additionally, a portion of the isolated or purified particles can be removed and analyzed while the remaining portion is used for generating the sample.

In an embodiment, the ion or particle generator comprises one or more ion or particle guides able to transmit the analyte beam to the receiving surface of the sample holder in the vacuum chamber. In an embodiment, the one or more ion or particle guides are multipoles having six or more rods, including but not limited to octopoles. For example, in instances where the ion or particle generator is a mass spectrometer, one end of the ion guide is attached to a cell or component of the mass spectrometer (such as an ion trap, multipole, collision cell, C-trap, an additional ion or particle guide, or an extraction region of time of flight instrument), and the second end of the ion guide is attached or indirectly connected to the sample vacuum chamber. A vacuum valve is able to isolate at least one of the ion or particle guides from the sample vacuum chamber and allow that ion or particle guide to have an internal pressure independent from the sample vacuum chamber when isolated. As used in the embodiments described herein, the vacuum valve may be any suitable valve is known in the art, including but not limited to vacuum gate valves. The ion or particle guide may be separated by the vacuum valve into multiple regions or separated to form separate guides. Similarly, different ion or particle guides may be joined together to form a single function unit having a continuous analyte path to the sample vacuum chamber.

Optionally, the first ion guide comprises a linear slide able to move the first ion guide and connect and disconnect the first ion guide to the first vacuum gate valve. Alternatively, or in addition to, the second ion guide comprises a linear slide able to move the second ion guide toward and away from the first vacuum gate valve, wherein the linear slide is able to connect and disconnect the first ion guide to the first vacuum gate valve.

The ion or particle guide is optionally a retractable ion guide having a first end connected to a cell or chamber of the ion or particle generator and a second end comprising a linear slide, where the second end is able to be moved relative to the sample vacuum chamber. By using the linear slide, the retractable ion guide can be moved within the sample vacuum chamber. Alternatively, the linear slide may be used to move the first end of the ion or particle guide so as to connect or disconnect the guide from the rest of the ion or particle generator.

In an further embodiment where the ion or particle generator is a mass spectrometer, the system comprises: a) a first ion guide having a first and second end, wherein the first end of the first ion guide is connected to a cell or chamber of the mass spectrometry device, and the second end of the first ion guide is connected to a first vacuum gate valve; and b) a second ion guide having a first and second end, wherein the first end of the second ion guide is connected to the first vacuum gate valve, and the second end of the second ion guide is connected to the sample vacuum chamber. The first vacuum gate valve is able to isolate the first ion guide from the second ion guide and allow the first ion guide to have a different pressure than from the second ion guide and vacuum chamber when isolated.

The temperature control means can be any cooling device as known in the art able to generate cryogenic or near cryogenic temperatures. In an embodiment, the temperature control means comprises a container in fluid communication with the sample vacuum chamber, where the container is able to provide a cooling fluid to the sample vacuum chamber and reduce the temperature receiving surface of the sample holder. The cooling fluid is preferably a cryogen, including but not limited to liquid nitrogen. In an embodiment, the cooling fluid is circulated through the sample vacuum chamber.

As used in embodiments described herein, the temperature control means is able to provide a temperature of −90° C. or less to the receiving surface of the sample holder, preferably −100° C. or less, −130° C. or less, −150° C. or less, −175° C. or less or −185° C. or less.

In an embodiment, the present invention provides a sample holder comprising: a) a substrate having a receiving surface, b) an annular clip ring having a center cavity or depression able to hold the substrate, wherein the substrate is adhered to the clip ring; c) a button front plate having a central opening extending through the button front plate, wherein the button front plate contacts a front and/or outer surface of the clip ring; and d) a button back plate contacting a back and/or outer surface of the clip ring. Preferably, the substrate is a transmission electron microscopy (TEM) grid.

The button front plate and back plate enclose the clip ring and substrate, thereby forming a solid button assembly, wherein the receiving surface of the substrate is aligned with the central opening of the button front plate.

The substrate is adhered to the annular clip ring using a thermo-conductive grease or gel material, which does not shrink or become distorted at cryogenic temperatures, thereby protecting the substrate from damage during extreme cooling. Optionally, the sample holder further comprises a clip ring restraint that at least partially surrounds the outer surface of the clip ring and extends radially outward from the button assembly. The clip ring restraint can help maintain the position of the clip ring and also provides additional surface area for a coolant to contact for cooling.

In a further embodiment, the present invention provides a cold box positioned within the sample vacuum chamber, where the cold box comprises: a thermal mass front plate having an opening extending through the thermal mass front plate, a thermal mass rear plate in contact with the thermal mass front plate, and a cavity between the thermal mass front plate and back plate able to hold the button assembly. The opening of the thermal mass front plate is aligned with the central opening of the button front plate and the receiving surface of the substrate (preferably a TEM grid). The ion or particle generator transmits the analyte beam and/or vapor stream through the opening in the thermal mass front plate to the receiving surface. Optionally, the thermal mass rear plate is in thermal contact with the substrate, and contains one or more regions in thermal contact with a circulating cooling fluid (preferably a cryogenic). Accordingly, the substrate holder is cooled by circulating the cooling fluid through the rear plate.

A mechanical actuator able to select and position a button assembly into the cold box so that the opening of the thermal mass front plate is aligned with the central opening of the button front plate and the receiving surface of the substrate. Optionally, the central cavity of the cold box is designed to be able to hold two or more button assemblies, and the mechanical actuator is able to mechanically position the desired button assembly to be aligned with the central opening of the button front plate.

In an embodiment, the present invention provides a method for preparing a sample for cryo-electron microscopy (cryo-EM) comprising the steps of:

a) generating charged or uncharged analyte particles and collecting the analyte particles in an ion guide, wherein the ion guide comprises a vacuum valve separating the ion guide into a first region and a second region, wherein the first region has a first internal pressure;

b) positioning a sample holder having a receiving surface in a sample vacuum chamber having a second pressure when the vacuum valve is closed, wherein the sample vacuum chamber is connected to the second region of the ion guide;

c) cooling the receiving surface in the sample vacuum chamber to a temperature of −100° C. or less;

d) producing a controllable vapor stream, wherein the vapor stream is able to generate an amorphous solid;

e) opening the vacuum valve and transmitting the analyte particles from the first region of the ion guide, through the second region, and into the sample vacuum chamber;

f) transmitting the vapor stream into the sample vacuum chamber; and g) contacting the cooled receiving surface with the analyte particles and vapor stream, thereby forming a layer of analyte particles on the receiving surface, wherein the analyte particles are coated with the amorphous solid.

Optionally, the receiving surface in the sample vacuum chamber is cooled to a temperature of −90° C. or less, −100° C. or less, −130° C. or less, −150° C. or less, −175° C. or less or −185° C. or less. The first pressure in the first region of the ion guide and the second pressure in the sample vacuum chamber are maintained independently from one another through use of the vacuum valve. In an embodiment, the first pressure in the first region of the ion guide is equal to or less than $10^{-3}$ Torr, and the second pressure in the sample vacuum chamber is equal to or less than $10^{-4}$ Torr. In an embodiment, the first pressure in the first region of the ion guide and the second pressure in the sample vacuum chamber, independently from one another, are equal to or less than $10^{-5}$ Torr. In an embodiment, the second pressure in the sample vacuum chamber is equal to or less than $10^{-6}$ Torr.

After the layer of the analyte particles coated with the amorphous solid has been formed on the receiving surface, the vacuum valve is closed and the receiving surface is removed from the sample vacuum chamber to a storage container or directly to cryo-EM instrument. Preferably, the temperature and pressure of the sample vacuum chamber is adjusted so that the amorphous solid does not warm, degrade, crystallize, or become contaminated while the sample holder is removed from the sample vacuum chamber. In an embodiment, the temperature of the sample holder is maintained at a temperature of −100° C. or less while being removed from the sample vacuum chamber.

Preferably, at least a portion of the vapor stream and analyte particles are transmitted into the sample vacuum chamber at the same time. As a result, a coating of the amorphous solid may be formed on the analyte particles prior to the analyte particles being deposited on the receiving surface of the sample holder. Alternatively, at least a portion of the analyte particles is transmitted into the sample vacuum chamber before the vapor stream is transmitted into the sample vacuum chamber. As a result, the coating of the amorphous solid will be formed after the analyte particles are deposited on the receiving surface. It is also possible to transmit a portion of the analyte particles simultaneously with the vapor stream and continue to provide the vapor stream so that the amorphous solid is generated during deposition and after deposition of the analyte particles onto the receiving surface.

As used in the embodiments described herein, the sample holder can comprise any substrate suitable for use in electron microscopy, including but not limited to an electron microscopy (EM) grid as known in the art. The sample holder may comprise a metal, including but not limited to copper, rhodium, nickel, molybdenum, titanium, stainless steel, aluminum, gold, or combinations thereof as known in the art. Additionally, the sample holder may comprise a continuous film or membrane so as to provide a solid support for the formation of the amorphous solid. Preferably, the sample holder is an EM grid covered by a thin film or membrane which includes, but is not limited to, films and membranes comprising graphene, graphene oxide, silicon oxide, silicon nitride, carbon, and combinations thereof. With a grid that does not contain a film or membrane, the vapor stream intended to form the amorphous solid may pass through at least a portion of the holes in the grid without producing a suitable layer. Preferably, the sample holder is thin enough to be transparent to electrons without scattering. Preferably, the film or membrane has an approximate thickness or 15 nm or less, 10 nm or less, 5 nm or less, 2 nm or less, or 1 nm or less. In an embodiment, the sample holder is an EM grid comprising a graphene or graphene oxide monolayer film or membrane positioned across the surface of the grid.

Amorphous solids, or non-crystalline solids, refer to solids that lack the long-range molecular order characteristic of crystals. For example, ice formed using the methods and systems described herein is preferably amorphous ice (also referred to herein as vitreous ice). Common $H_2O$ ice is a hexagonal crystalline material where the molecules are regularly arranged in a hexagonal lattice. In contrast, amorphous ice lacks the regularly ordered molecular arrangement. Amorphous ice and the other amorphous solids available with the present invention are generally produced either by rapid cooling of the liquid phase (so the molecules do not have enough time to form a crystal lattice) or by compressing ordinary ice (or ordinary solid forms) at very low temperatures.

Optionally, the amount of atoms or molecules deposited on the analyte particles to form the amorphous solid layer are determined and monitored, such as by a mass analyzer. This allows the thickness of the amorphous solid layer to be controlled by adjusting the amount of atoms or molecules contacting the analyte particles. For example, in an embodiment, the present methods further comprise adjusting the thickness of the amorphous solid layer around each of the analyte particles by adjusting the concentration of the atoms or molecules in the vapor surrounding the analyte particles. In an embodiment, the thickness of the amorphous solid layer around each of the analyte particles is adjusted by adjusting the mixing time between the analyte particles and the vapor.

Preferably the vapor stream is controlled, the concentration of atoms or molecules in the vapor stream is adjusted, or the deposited amorphous solid layer is otherwise refined, so that the amorphous solid layer encasing the analyte particles has a thickness of 5 microns or less, 2 microns or less, 1 micron or less, 500 nm or less, 150 nm or less, or 100 nm or less. Preferably, the amorphous solid layer around each analyte particle has a uniform thickness which does not vary by more than 5%. Preferably, the layer of the amorphous solid has an extent of crystallinity less than or equal to 1%. Preferably, the layer of the amorphous solid has a purity of at least 85%, 90%, 95%, or 99%.

The vapor stream used in the present invention can comprise any molecules or atoms able to form amorphous solids where exposed to extremely low temperatures and pressures. Such molecules and atoms include, but are not limited to, cyclohexanol, methanol, ethanol, isopentane, water, $O_2$, Si, $SiO_2$, S, C, Ge, Fe, Co, Bi and mixtures thereof. Optionally, the vapor stream comprises charged molecules. In an embodiment, the vapor stream comprises water molecules and the amorphous solid is amorphous ice.

In an embodiment, the vapor stream is generated using a Knudsen-type effusion cell, a molecular beam doser, or a co-effusion of a matrix with analyte into the system. Optionally, the vapor stream is characterized by an intensity selected from the range of 4.8E9 to 2.8E11 molecules per $\mu m^2$ per second and/or a spot size selected from the range of 800 $\mu m^2$ to 3.8E7 $\mu m^2$. In an embodiment, the vapor stream comprises a flux of molecules having a uniformity within 98% over an area of 7 $mm^2$. In certain embodiments, the vapor stream is a molecular beam. Molecular beams are streams of molecules traveling in the same or similar direction and can be produced by allowing a gas at higher pressure to expand through a small orifice into a chamber at lower pressure to form the beam. Preferably, the incident trajectory of the particles of the vapor stream contacting the substrate surface is within 1 degree of normal to the substrate surface.

The analyte particles can be charged or uncharged particles depending on the deposition method used to deposit the particles. Preferably, the analyte particles and the molecules making the amorphous solid layer are substantially randomly orientated when deposited on the substrate, such as on a membrane, film, or TEM grid. In embodiments, the analyte particles are deposited on the substrate surface using an analyte beam, which is preferably an ion beam, molecular beam, or particle beam. In embodiments, the analyte particles are ions formed using techniques including, but not limited to, electrospray ionization and laser desorption, such as matrix-assisted laser desorption/ionization (MALDI). Preferably, the analyte particles are ionized under native electrospray conditions so as not to perturb structural conformation of the particles. In a further embodiment, the analyte ions are formed using a mass spectrometer which optionally isolates or purifies the analyte ions. Alternatively, the particle beam is a molecular beam. In a further embodiment, the molecular beam is produced by creating an aerosol of an analyte particle containing solution and introducing the aerosol into the vacuum system.

In embodiments where the analyte particles are deposited using an analyte beam, the analyte beam is characterized by an intensity selected from the range of 0.025 to 25 particles per 1 $\mu m^2$ per second, 0.05 to 10 particles per 1 $\mu m^2$ per second, or 0.1 to 5 particles per 1 $\mu m^2$ per second. In certain embodiments, the analyte beam is characterized by a spot size selected from the range of 800 $\mu m^2$ to 3.8E7 $\mu m^2$.

In an embodiment, the analyte particles are purified or isolated, such as by a mass spectrometer device, before being deposited onto the amorphous solid. Preferably, the analyte beam is characterized by a purity of at least 50%, 60%, 75%, 85%, 90%, 95%, or 99%. For analyte particles, such as proteins, which may have significant conformational structures, it is desirable that the analyte beam is characterized by a conformation purity of at least 50%, 60%, 75%, 85%, 90%, 95% or 99%. For example, it may be desirable to analyze the structure of a particular protein as expressed in a cell. Accordingly, it is necessary to provide an EM sample where all or most of the protein analyte molecules retain the same conformational structure.

Analyte particles useful with the present invention include, but are not limited to, protein molecules, peptides, glycans, metabolites, drugs, and complexes thereof, multi-protein complexes, protein/nucleic acid complexes, nucleic acid molecules, virus particles, micro-organisms, sub-cellular components (e.g., mitochondria, nucleus, Golgi, etc.), and whole cells. In some embodiments, the analyte particles are molecular entities, single molecules, or multiple molecules complexed together through non-covalent interactions (such as hydrogen bonds or ionic bonds). In embodiments, the analyte particles have a molecular mass exceeding 500, 1,000 Daltons, 10,000 Daltons, 50,000 Daltons, 100,000 Daltons, or 150,000 Daltons.

In an embodiment, the analyte particles are ions and the analyte source is able to generate a controllable ion beam containing charged analyte ions (such as electrospray ion deposition) and direct the ion beam to contact the receiving surface of a cryo-EM probe. In a further embodiment, the system further comprises a modified mass spectrometer that can provide purified ions to the analyte source. In another embodiment, the system comprises an electron microscope where the cryo-EM probe is directly transferred from the deposition portion of the instrument to the microscope portion of the instrument for analysis.

DETAILED DESCRIPTION OF THE INVENTION

Overview

Figure 1:
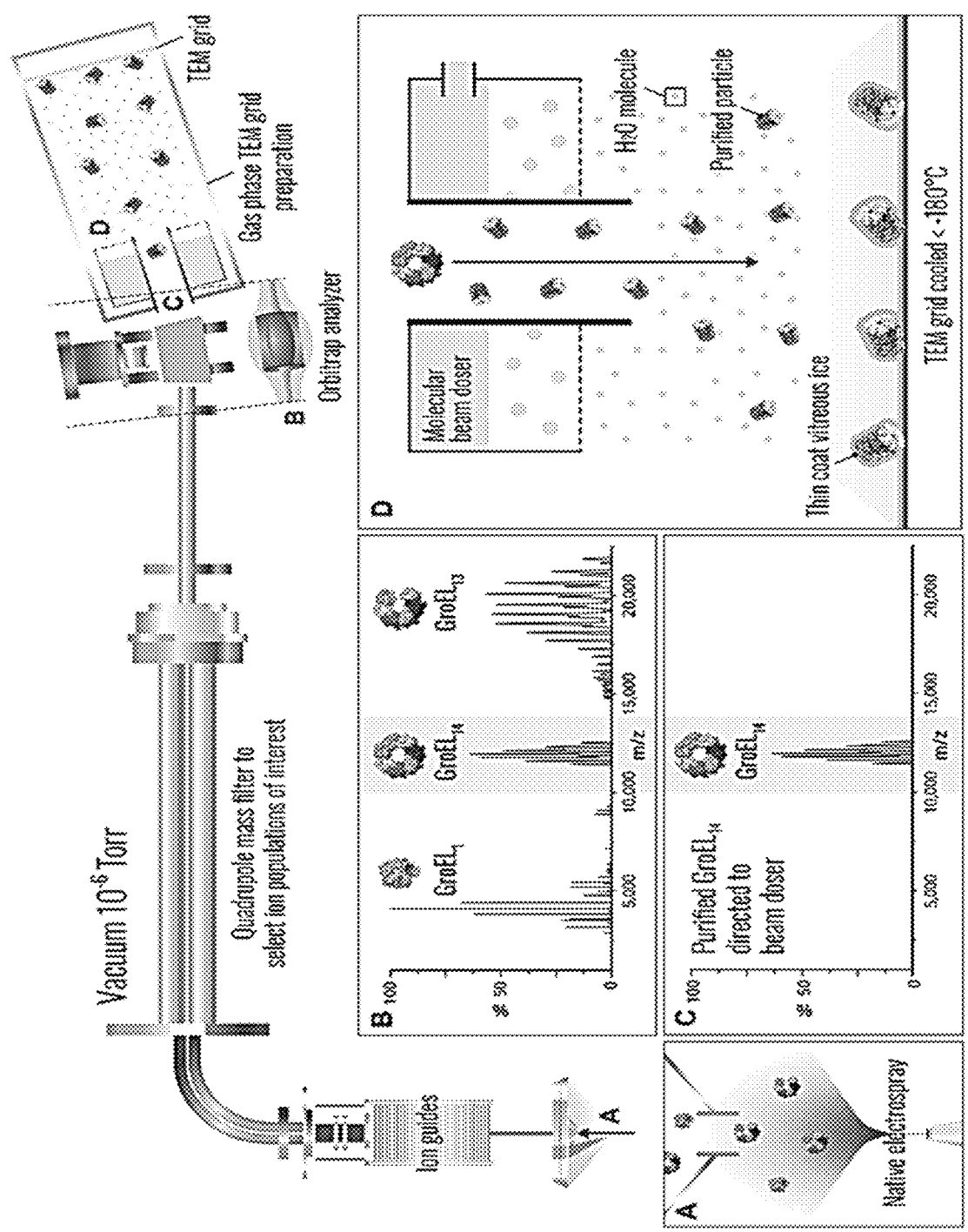
FIG. 1 illustrates a mass spectrometer (top) in an embodiment adapted to purify and land native protein complexes onto cryogenically cooled TEM grids and coat with amorphous ice. Protein complexes are gently ionized and transferred to the vacuum chamber of the MS (panel A). In an example, mass is determined using an Orbitrap mass analyzer, revealing a sample containing a GroEL monomer, complete complex (GroEL$_{14}$), and a sub-population of incomplete complexes (GroEL$_{13}$) (panel B). The quadrupole mass filter is then used to purify the intact complex (GroEL$_{14}$) from the others and direct these particles into an added chamber (panel C). This chamber directs the particles land onto a TEM grid coated with a monolayer of graphene (panel D).

Cryo-electron microscopy (cryo-EM) provides three-dimensional structural information on non-crystalline specimens and is an emergent powerful tool for the structural studies of proteins and macromolecular assemblies, including protein complexes and viruses (Stark and Chari, "*Sample preparation of biological macromolecular assemblies for the determination of high-resolution structures by cryo-electron microscopy*," Microscopy, 2016, 65(1): 23-34). With the development of a new class of electron detectors and advances in software image reconstruction, cryo-EM has approached atomic level resolution, enabling many new biological discoveries and driving further biological inquiry. However, the image resolution achievable with transmission electron microscopes is not easily obtainable when analyzing biological samples, and sample preparation is a significant bottleneck.

Imaging by cryo-EM requires that a purified sample be vitrified, as encasing the sample in amorphous (vitreous) ice helps protects the sample from radiation damage from the electron microscope. However, current apparatuses used to prepare an EM grid with the vitrified sample are not directly connected to the cryo-EM system. As a result, once the sample has been deposited on an EM grid and coated in the amorphous solid, the EM grid must be removed from vacuum and then transferred into the vacuum of the cryoEM system.

Removing grids from vacuum to atmosphere without destroying or contaminating the sample is extremely difficult, as doing so requires mechanical manipulation of extremely delicate materials. To address these problems, the present invention provides devices and methods that enable in vacuo vitrification methods, including the recently developed biomolecular vapor deposition (BVD) method (an embodiment of which is described in WO 2019/010436), and reduce the exposure of the EM grid to potentially damaging environments. Embodiments of the present invention can increase image resolution of cryo-EM, decrease image acquisition time, and allow for many orders of magnitude increase in sensitivity.

Example 1—Biomolecular Vapor Deposition

In biomolecular vapor deposition (BVD), a mass spectrometry (MS) device is utilized with cryo-EM gas phase sample preparation in order to purify proteins and protein complexes in the gas-phase for subsequent in vacuo vitrification. Samples prepared in this way can be extracted from the mass spectrometer using the cryo-transfer sample holder and placed directly into an EM for imaging.

Gas-phase biomolecule freezing prior to surface deposition may be especially useful for fragile or flexible molecules, allowing the molecules to retain their condensed phase shape by removing as much of their energy as possible before they contact the grid. A common practice in the field of gas-phase IR spectroscopy, freezing biomolecules in the gas-phase can be accomplished through the use of supersonic beams, decelerated beams, cooled or slowed buffer gases, or cryogenically cooled ion traps, amongst other methods (see Rijus and Oomens, "*Gas-phase it spectroscopy and structure of biological molecules*," Topics in current chemistry, 2015, Vol. 364; and Wall et al., "*Preparation of cold molecules for high-precision measurements*," Journal of Physics B-Atomic Molecular and Optical Physics, 2016. 49(24)). Boyarkin et al. have further demonstrated the utility of a cryogenically cooled octopole ion trap to remove energy from biomolecules ("*Cryogenically cooled octopole ion trap*

*for spectroscopy of biomolecular ions*," Review of Scientific Instruments, 2014, 85, 033105).

The integration of MS and cryo-EM sample preparation allows particle deposition on a transmission EM (TEM) grid and vitreous ice formation concomitantly (first demonstrated on a QE-UHMR mass spectrometer). An expanded example of a BVD method is generally depicted in FIG. 1. Protein complexes are gently ionized and transferred to the vacuum chamber of the MS device (FIG. 1, panel A). Mass is determined using an Orbitrap mass analyzer (FIG. 1, panel B), and the quadrupole mass filter is then used to purify the intact complex and direct these particles into an added chamber (FIG. 1, panel C).

BVD requires a cryogenically cooled surface to support the TEM grid and a molecular beam doser that does not interfere with the path of the biomolecular ions. A special enclosed multipole-ion guide was developed for this purpose. This guide transports the ions from the mass spectrometer C-trap to a separate vacuum chamber containing the cooled surface. Within the multipole enclosure are multiple small dosers aimed between the gaps of the ion guide rods and toward the enclosure's exit lens (FIG. 1, panel D). This design enables the MS-generated ions and water molecules to simultaneously exit the ion guide and impinge on a TEM grid, which will have been cooled to approximately −185° C. Finally, the custom ion guide is able to be physically split to allow for the passage of a vacuum gate separating the cryogenic chamber from the mass spectrometer, thereby permitting the removal of the TEM grid with no disruption to the vacuum of the mass spectrometer.

Compared to current methods, biomolecular vapor deposition methods stand to generate a highly improved cryo-EM sample in that particles are randomly oriented at desired densities with a thin coating of amorphous ice; structural artifacts resulting from the air-surface interface are reduced or eliminated; and the contrast between the particles and the surrounding ice are sharpened, allowing for high-resolution images of smaller particles.

Example 2—Retractable Ion Guide

In one example of a successful BVD method, several key steps are performed. Firstly, biomolecular ions are transported from a mass spectrometer to a TEM grid cryogenically cooled to −185° C. During the collection of the particles onto the TEM grid, water vapor is introduced into the vacuum for ice formation. Once deposition of particles and ice on the TEM grid is complete, the chamber containing the grid is raised to a pressure where nitrogen will not sublimate and remain a liquid at −190° C. While maintaining a temperature below −175° C., the TEM grid is evacuated from the chamber into a storage container or transported directly to a cryo-EM instrument.

Figure 2:
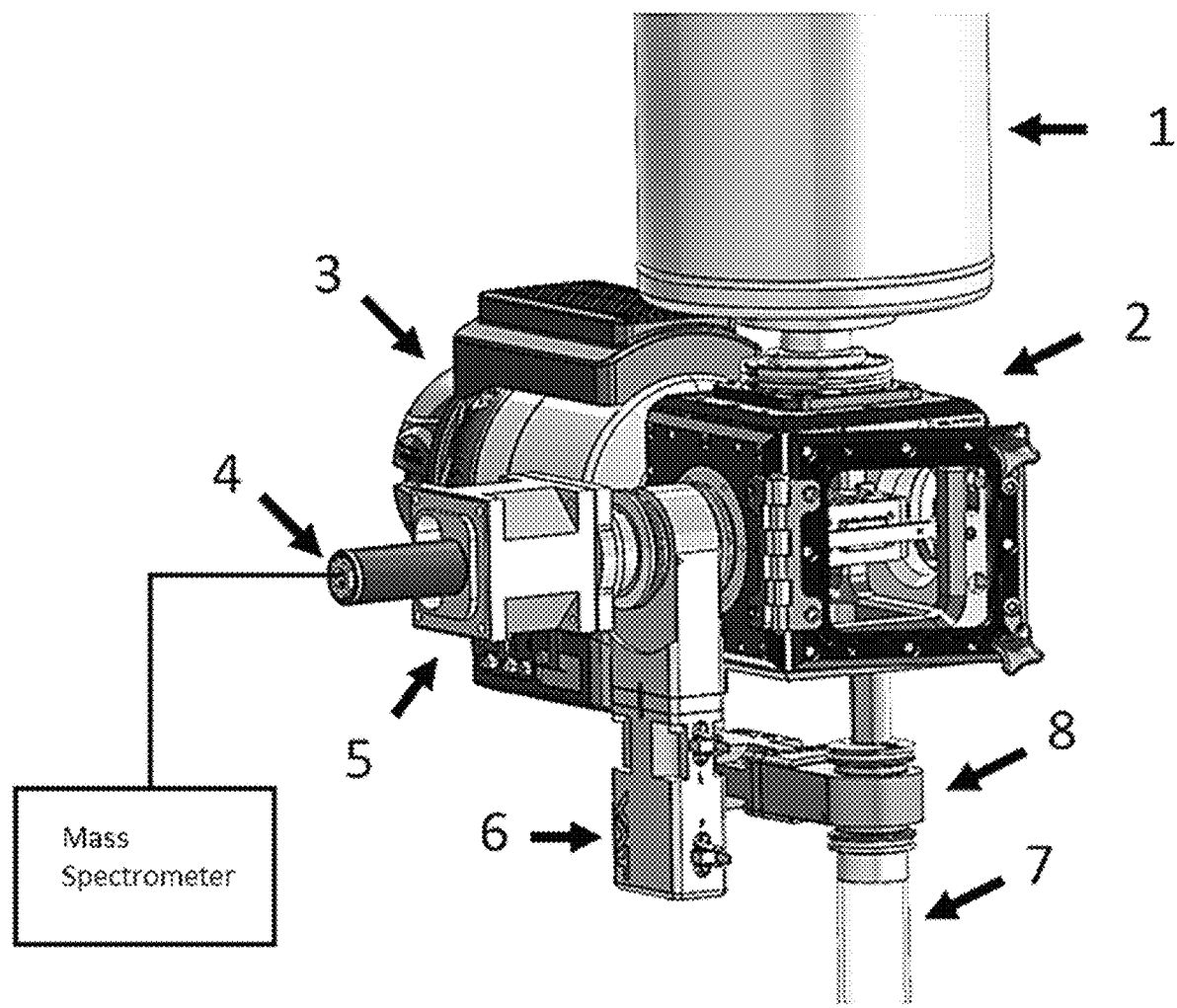
FIG. 2 shows a cryo-EM sample preparation device in an embodiment of the invention for integration with a mass spectrometer (in this embodiment, a QE-UHMR mass spectrometer). The mass spectrometer is connected through a segmented ion guide to a sample vacuum chamber, which is able to hold the EM grid. An attached dewar provides liquid nitrogen to the sample vacuum chamber, and a turbo pump is able to provide the necessary vacuum. The end of the segmented ion guide opposite from the mass spectrometer is attached to a collision cell vacuum chamber, which can be isolated from the sample vacuum chamber through a vacuum gate valve. Once the sample biomolecule has been deposited, the EM grid can be directly placed in a removable liquid nitrogen sample dewar or other storage container connected to the sample vacuum chamber.
Figure 3:
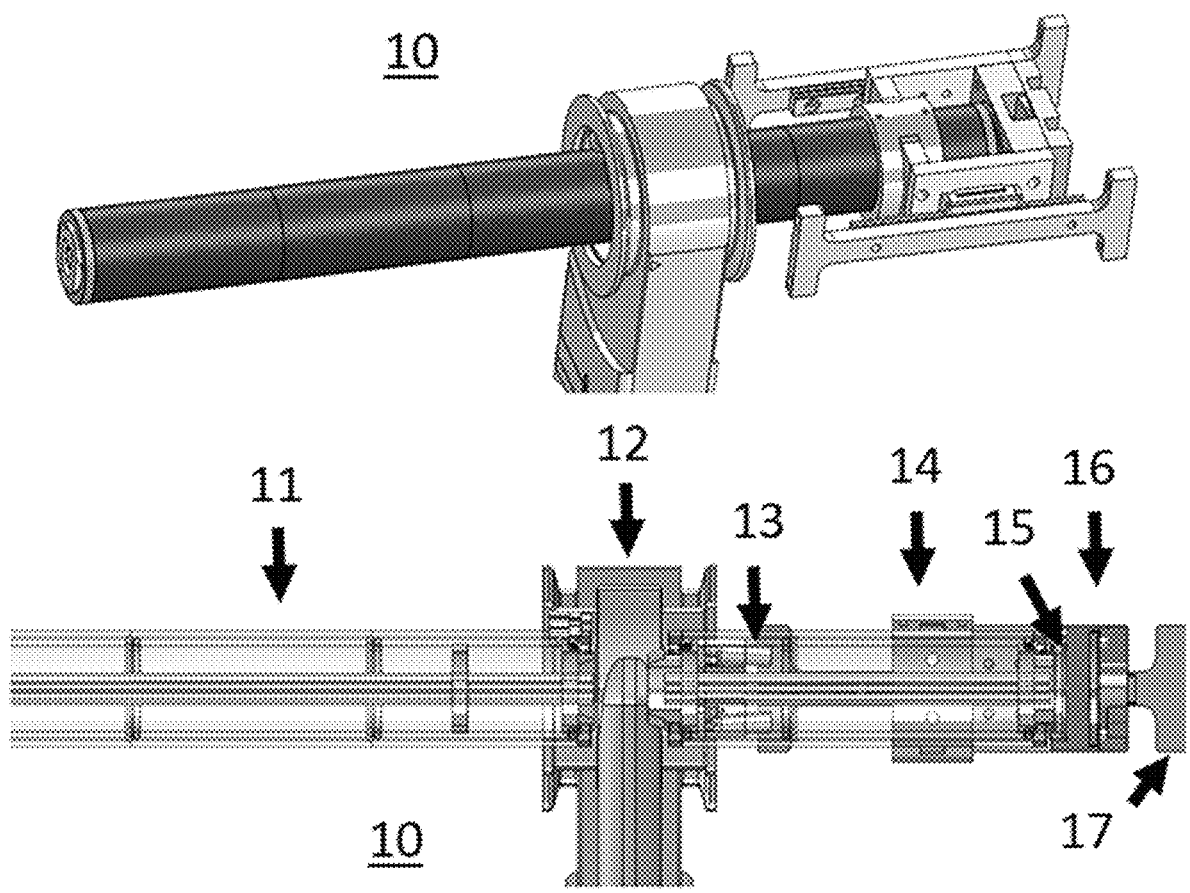
FIG. 3 shows an example of a retractable ion guide, full view (top) and cross-sectional view (bottom), in an embodiment of the invention. A vacuum gate valve can be used to isolate an ion guide connected to a mass spectrometer from the downstream components, allowing samples to be easily removed from the mass spectrometer. A second ion guide (also referred to as a grid ion guide) is mechanically fixed to a cooling box containing the EM grid but remains thermally and electrically isolated. This assembly is attached to a linear slide which allows it to move within the sample vacuum chamber. When the vacuum gate is open, the linear slide moves the assembly to come in contact with the first ion guide, allowing samples to be transported from the mass spectrometer to the EM grid. Molecular beam dosers are integrated with the ion guide in order to provide the vapor forming the amorphous solid to the EM grid.

In this example, the instrument components used to remove the TEM grid are illustrated in FIGS. 2 and 3. The sample vacuum chamber 2 contains a chilling unit for the TEM grid which is cooled to −185° C. using circulating liquid nitrogen supplied by the large dewar 1. The sample vacuum chamber 2 is maintained at low pressures by its own ultrahigh vacuum pump 3. When necessary, the sample vacuum chamber 2 can be isolated from the vacuum of the mass spectrometer by the first vacuum gate valve 6. Isolation of the sample vacuum chamber 2 is required during loading and removal of the sample grid. Ions are transported from the mass spectrometer to the sample grid through a segmented multipole ion guide 4 that contains the molecular a beam doser 13 for ice generation, and can be separated to allow closure of the first vacuum gate 6.

Receiving ions from the mass spectrometer is optionally accomplished through the implementation of a fully enclosed and retractable ion guide 10 as illustrated in FIG. 3. The retractable ion guide 10 allows for ions to be received from the mass spectrometer while also enabling removal of the TEM grid without exposure to atmosphere. For this example, ions are trapped with the C-trap of a QE-UHMR mass spectrometer. On the far side of the C-trap (opposite the side of ion entry) is typically a collisional cell used to fragment or desolvate ions. The collisional cell is held in place by the final segment of the mass spectrometer's high vacuum chamber 5. For the purpose of collecting ions for cryo-EM imaging there is no need for collisional fragmentations; thus, the collision cell was replaced with a segment of an octopole ion guide 11. However, this octopole ion guide 11 can also act as a collision cell if needed. The design of the guide allows it to be held in place by the final vacuum chamber of the mass spectrometer without modification to that chamber. In contrast, the end cover of the vacuum chamber 5 is modified to accommodate the additional ion guide length and placement of the vacuum gate valve 12.

On the other side of the vacuum gate valve 12 is a second octopole ion guide 14. This second octopole ion guide (also referred to as the grid ion guide) 14 leads to cooling box 16 containing the cryo-EM grid. The grid ion guide 14 is mechanically fixed to the cooling box 16 but remains thermally and electrically isolated. This assembly is attached to a linear slide 17 which allows it to be moved within the sample vacuum chamber 2. When the first vacuum gate 6 is open, the assembly slides in order to come in contact with the first octopole ion guide 11 connected to the mass spectrometer, forming a single ion guide. This is important as the physical constraints imposed by the vacuum gate leave a large gap in which the ions would otherwise be lost. Using electrostatic ion optics to move ions across this gap would require the ions to have significant energy, which would be detrimental to their landing on the cryo-EM grid. Optionally, the first octopole ion guide 11 connected to the mass spectrometer receives its electrical feeds from the second octopole ion guide 14 when they come into contact through a specially design connector (not shown). After the sample has been collected, the second octopole ion guide 14 and cooling box 16 are slid back into the sample vacuum chamber 2 far enough to allow the vacuum gate valve 6 to close. Within the enclosed second octopole ion guide 14 are miniature molecular beam dosers 13 that provide water vapor and an exit lens 15 to provide the vapor to form the amorphous ice while keeping the octopole region as sealed as possible.

At this point, ions are ready to be transferred to the TEM grid. The vacuum gate valve 6 is open, the first and second octopole ion guides 11 and 14 are joined as a single unit, and the grid is cooled to −185° C. A small amount of water vapor is released into the octopole through the doser 13. A percentage of these water molecules will exit the through the aperture of the exit lens 15 and impinge on the cryo-EM grid, forming a thin layer of amorphous ice and making an ideal surface on which ions will land.

Normal operation involves first sending the ions to the C-trap from which they can be transferred to the orbitrap for mass analysis or the collision cell for fragmentation. Since the collision cell has been swapped out with the first octopole ion guide 11, sending the ions to the collisional cell in fact sends the ions to the cryo-EM grid in the sample vacuum chamber 2. This allows the cryo-EM attachment to be completely independent of the mass spectrometer; no modification to the mass spectrometer control software or electronics is required. When sufficient time has passed to collect particles, the operator can simply stop sending the particles to the first octopole ion guide 11. At this point additional water vapor may be released through the dosers 13 coating the landed particles with ice. The second octopole ion guide (or grid ion guide) 14 and cooling box 16 are then retracted and the first vacuum gate valve 6 closed in proration for grid extraction.

Example 3—Removal of the Grid from Vacuum

To remove a grid that has been prepared with amorphous ice and biomolecules according to the above examples, the grid is transported from a region of ultrahigh vacuum to an environment of liquid nitrogen without ever reaching a temperature greater than −170° C. or being exposed to water in the atmosphere. The removal process begins by retracting the grid ion guide 14 and cooling box 16 out of the path of the vacuum gate valve 12, at which point the vacuum gate valve 12 can be closed. The mass spectrometer vacuum region and sample vacuum chamber 2 are now effectively separated. To raise the pressure in the sample vacuum chamber 2, the vacuum pump 3 is switch off and pressure is elevated by pumping liquid nitrogen into this chamber.

While the pressure is low, the liquid nitrogen immediately turns into solid nitrogen which then sublimates into gaseous nitrogen. As the pressure elevates, the liquid nitrogen entering the sample vacuum chamber 2 remains in the liquid form, helping to keep the surrounding area cold and free of water. At this point, the removable dewar 7 is filled with liquid nitrogen and submerged into a larger dewar of liquid nitrogen (not shown). Once the nitrogen begins to enter the sample vacuum chamber 2 as a liquid, the second vacuum gate valve 8 above the removable dewar 7 can be opened. The mechanical actuator (28 in FIG. 5) is then rotated, releasing the grid from the cooling box 16 into the removal dewar 7. The removable dewar 7 and grid can then be placed in long-term storage or taken to the microscope for analysis.

Example 4—Grid Mounting and Holding

Figure 4:
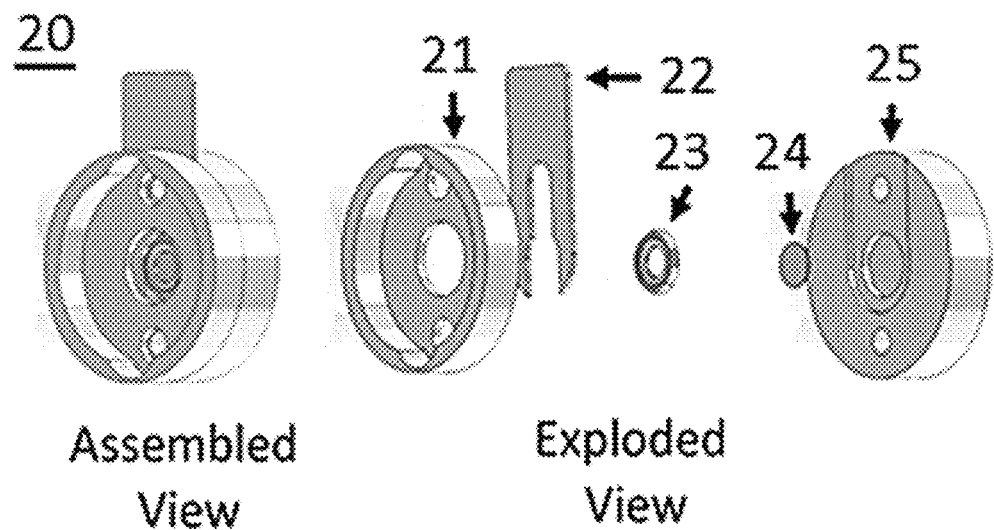
FIG. 4 shows an assembled view (left) and exploded view (right) of a TEM grid button assembly in an embodiment of the invention. The button assembly comprises a front and back plate, and a grid restraint and clip-ring able to position and hold a TEM grid between the front and back plate.
Figure 5:
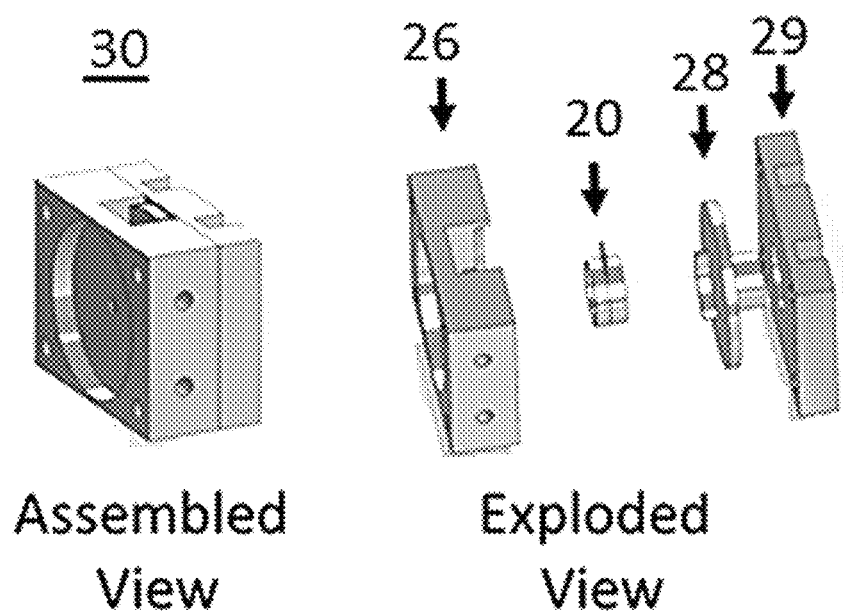
FIG. 5 shows an assembled view (left) and exploded view (right) of a cold box in an embodiment of the invention. The cold box is able to hold a TEM grid button assembly and allow coolant to be circulated through the rear plate of the cooling box. A mechanical actuator positions the holding button within the cooling box so the ions from the mass spectrometer enter the cooling block contact the desired area of the grid.

FIGS. 4 and 5 illustrate a TEM grid holder able to facilitate the devices and systems described in the above examples. The grid holder includes a grid button assembly (FIG. 4) and a cold box (FIG. 5), and is designed to protect the TEM grid, which is thin enough to be transparent to electrons. The grid holder also provides excellent thermal and electric conductivity to the TEM grid, which is required for maintaining and analyzing the sample. In addition, the grid holder allows a user to transfer the TEM grid to an in-situ cooling probe for cryo-EM while remaining submerged in liquid nitrogen.

The grid button assembly 20 comprises a front plate 21 and back plate 25, and a grid restraint 22 and clip-ring 23 able to position and hold a grid 24 between the front and back plate. In this example, the grid 24 (or probe) is a Gatan 626 single tilt liquid nitrogen cryo-transfer holder. Here, the first step, which is unique to the present invention, is to adhere the TEM grid 24 to the clip-ring 23. The clip-ring 23 is specific to the present cryo-EM instrument and cryo-probe employed. The adhesion is accomplished using Apiezon N Cryogenic Vacuum Grease. The grease is first silkscreened onto the back of the clip-ring 23, which allows for precise control over the thickness and area of application of the grease. At room temperature the surface tension of the grease is enough to hold the grid 24 in place. At cryogenic temperatures it becomes a solid with excellent thermal conductivity properties. This is important as any heat imparted by biomolecule impact should be removed as quickly as possible.

Using a specially designed alignment jig (not shown here), the clip-ring 23 and grid 24 is inserted between the front plate 21 and back plate 25, and the restraint 22 is slid in place fixing the grid 24 and clip-ring 23 in place. Components of the grid button assembly 20 are constructed of oxygen-free carbon with sufficient thermal mass to prevent sudden grid temperature swings.

Example 5—Mounting Technique

The cooling box 30 comprises a thermal mass front plate 26 and a thermal mass rear plate 29. Once the grid button 20 is assembled, it is inserted into a slot in the cooling box 30 (formed by the assembly of the thermal mass front plate 26 and rear plate 29) by reaching through an access port or door of the sample vacuum chamber 2. The cooling box 30 can be imagined as the coin mechanism on a gumball machine kept at −185° C. The mechanical actuator 28 regulates the position of the grid button assembly 20 within the cooling box 30. The actuator 28 positions the grid button assembly 20 above, below, or on the ion optic axis (where the ions from the mass spectrometer enter the cooling block).

Current implementation of the cooling block 30 is set up to handle one grid button assembly 20 at a time; however, the vertical slot on the backside of the thermal mass front plate 26 can be extended to allow multiple grid button assemblies to be loaded into the cooling block 30 simultaneously. The mechanical actuator 28 would then allow serial feeding of the grid button assemblies onto the ion optic axis. The mechanical actuator 28 also applies force to the grid button assembly 20, ensuring good thermal contact, and is manipulated by a linear/rotational mechanical vacuum feedthrough (not shown). Cooling is provided by the thermal mass rear plate 29. The square channels on the backside of this plate 29 are fitted with copper tubing which allows flow of liquid nitrogen from the main dewar 1 (FIG. 2).

Upon insertion of the grid button assembly 20 into the cooling box 30 (initially at room temperate) the sample vacuum chamber 2 is sealed and the turbo vacuum pump 3 is engaged. This pump 3 provides an ultrahigh vacuum equal to or less than that of the mass spectrometer, approximately ~$10^{-6}$ torr. Once the desired level of vacuum is obtained, cooling begins by introduction of liquid nitrogen into the dewar 1, at which point flow of liquid nitrogen through the system and rear plate 29 begins. Temperature of the cooling block 30 is monitored using cryogenic diode temperature sensors. Once a temperature of −185° C. is reached the vacuum gate valve 6 is opened, joining the vacuum system of the sample vacuum chamber 2 with that of the mass spectrometer.

Having now fully described the present invention in some detail by way of illustration and examples for purposes of clarity of understanding, it will be obvious to one of ordinary skill in the art that the same can be performed by modifying or changing the invention within a wide and equivalent range of conditions, formulations and other parameters without affecting the scope of the invention or any specific embodiment thereof, and that such modifications or changes are intended to be encompassed within the scope of the appended claims.

When a group of materials, compositions, components or compounds is disclosed herein, it is understood that all individual members of those groups and all subgroups thereof are disclosed separately. Every formulation or combination of components described or exemplified herein can be used to practice the invention, unless otherwise stated. Whenever a range is given in the specification, for example, a temperature range, a time range, or a composition range, all intermediate ranges and subranges, as well as all individual values included in the ranges given are intended to be included in the disclosure. Additionally, the end points in a given range are to be included within the range. In the disclosure and the claims, "and/or" means additionally or alternatively. Moreover, any use of a term in the singular also encompasses plural forms.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements.

One of ordinary skill in the art will appreciate that starting materials, device elements, analytical methods, mixtures and combinations of components other than those specifically exemplified can be employed in the practice of the invention without resort to undue experimentation. All art-known functional equivalents, of any such materials and methods are intended to be included in this invention. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention claimed. The invention illustratively described herein suitably may be practiced in the absence of any element or elements, limitation or limitations which is not specifically disclosed herein. Headings are used herein for convenience only.

All publications referred to herein are incorporated herein to the extent not inconsistent herewith. Some references provided herein are incorporated by reference to provide details of additional uses of the invention. All patents and publications mentioned in the specification are indicative of the levels of skill of those skilled in the art to which the invention pertains. References cited herein are incorporated by reference herein in their entirety to indicate the state of the art as of their filing date and it is intended that this information can be employed herein, if needed, to exclude specific embodiments that are in the prior art.

The invention claimed is:

1. A cryo-electron microscopy (cryo-EM) sample preparation system comprising:
    a) a sample vacuum chamber;
    b) a sample holder positioned within the sample vacuum chamber, wherein said sample holder comprises a receiving surface;
    c) a temperature control means able to provide a temperature of −100° C. or less to the receiving surface of the sample holder;
    d) an ion or particle generator having an internal pressure, wherein the ion or particle generator is able to produce a controllable analyte beam containing charged or uncharged analyte particles and direct said analyte beam to contact the receiving surface of the sample holder, thereby depositing analyte particles onto the receiving surface; and
    e) a beam doser able to produce a controllable vapor stream and direct said vapor stream to contact the receiving surface of the sample holder, wherein the vapor stream generates an amorphous solid,
    wherein the sample vacuum chamber is able to be isolated from the ion or particle generator and produce an internal pressure different from the internal pressure of the ion or particle generator.

2. The system of claim 1 wherein the ion or particle generator comprises an ion or particle guide able to transmit said analyte beam to the sample vacuum chamber.

3. The system of claim 2 further comprising a vacuum gate valve able to isolate the ion or particle guide from the sample vacuum chamber and allow the ion or particle guide to have an internal pressure independent from the sample vacuum chamber when isolated.

4. The system of claim 2 wherein the ion or particle guide is a retractable ion guide having a first end connected to a cell or chamber of the ion or particle generator and a second end comprising a linear slide, wherein the second end is able to be moved within to the sample vacuum chamber.

5. The system of claim 1 wherein the ion or particle generator is a mass spectrometer device and the ion or particle guide is an ion guide.

6. The system of claim 5 wherein the mass spectrometry device comprises:
    a) a first ion guide having first and second ends, wherein the first end of the first ion guide is connected to a cell or chamber of the mass spectrometry device, and the second end of the first ion guide is connected to a first vacuum gate valve;
    b) a second ion guide having first and second ends, wherein the first end of the second ion guide is connected to the first vacuum gate valve, and the second end of the second ion guide is connected to the sample vacuum chamber,
    wherein the first vacuum gate valve is able to isolate the first ion guide from the second ion guide and allow the first ion guide to have a different pressure than from the second ion guide when isolated.

7. The system of claim 6 wherein the first ion guide comprises a linear slide able to move the first ion guide and connect and disconnect the first ion guide to the first vacuum gate valve.

8. The system of claim 6 wherein the second ion guide comprises a linear slide able to move the second ion guide toward and away from the first vacuum gate valve, wherein the linear slide is able to connect and disconnect the first ion guide to the first vacuum gate valve.

9. The system of claim 1 wherein the temperature control means comprises a container in fluid communication with the sample vacuum chamber, wherein the container is able to provide a cooling fluid to the sample vacuum chamber and reduce the temperature receiving surface of the sample holder.

10. The system of claim 1 further comprising a storage container connected to the sample vacuum chamber and means for transporting the sample holder from the sample vacuum chamber into the storage container, wherein the storage container is able to be closed and isolated from the sample vacuum chamber after the sample holder is received into the storage container.

11. The systems of claim 1 wherein the sample holder comprises:
a) a transmission electron microscopy (TEM) grid;
b) an annular clip ring having a center cavity or depression able to hold the TEM grid,
wherein the TEM grid is adhered to the clip ring;
c) a button front plate having a central opening extending through the button front plate,
wherein the button front plate contacts a front and/or outer surface of the clip ring; and
d) a button back plate contacting a back and/or outer surface of the clip ring,
wherein the button front plate and back plate enclose the clip ring and TEM grid, thereby forming a solid button assembly, wherein a receiving surface of the TEM grid is aligned with the central opening of the button front plate.

12. The system of claim 11 further comprising a clip ring restraint, which at least partially surrounds the outer surface of the clip ring and extends radially outward from the button assembly.

13. The system of claim 11 further comprising a cold box positioned within the sample vacuum chamber, said cold box comprising: a thermal mass front plate having an opening extending through the thermal mass front plate, a thermal mass rear plate in contact with the thermal mass front plate, and a cavity between the thermal mass front plate and rear plateable to hold the button assembly, wherein the opening of the thermal mass front plate is aligned with the central opening of the button front plate and the receiving surface of the TEM grid.

14. The system of claim 13 further comprising a mechanical actuator able to select and position a button assembly into the cold box so that the opening of the thermal mass front plate is aligned with the central opening of the button front plate and the receiving surface of the TEM grid.

15. The system of claim 13 wherein the thermal mass rear plate is in thermal contact with the TEM grid through the button assembly, and contains one or more regions in thermal contact with a circulating cooling fluid.

16. A method for preparing a sample for cryo-electron microscopy (cryo-EM) comprising the steps of:
a) generating charged or uncharged analyte particles and collecting said analyte particles in an ion guide, wherein the ion guide comprises a vacuum valve separating the ion guide into a first region and a second region, wherein the first region has a first internal pressure;
b) positioning a sample holder having a receiving surface in a sample vacuum chamber having a second pressure when the vacuum valve is closed, wherein the sample vacuum chamber is connected to the second region of the ion guide;
c) cooling the receiving surface in the sample vacuum chamber to a temperature of $-100°$ C. or less;
d) producing a controllable vapor stream, wherein the vapor stream is able to generate an amorphous solid;
e) opening the vacuum valve and transmitting the analyte particles from the first region of the ion guide, through the second region, and into the sample vacuum chamber;
f) transmitting the vapor stream into the sample vacuum chamber; and
g) contacting the cooled receiving surface with the analyte particles and vapor stream, thereby forming a layer of analyte particles on the receiving surface, wherein the analyte particles are coated with the amorphous solid.

17. The method of claim 16 wherein the ion guide is part of a mass spectrometer.

18. The method of claim 17 further comprising purifying the analyte particles before the analyte particles enter the sample vacuum chamber.

19. The method of claim 16 wherein the first pressure in the first region of the ion guide and the second pressure in the sample vacuum chamber, independently from one another, are equal to or less than $10^{-4}$ Torr.

20. The method of claim 16 further comprising, after the layer of the analyte particles coated with the amorphous solid has been formed on the receiving surface, closing the vacuum valve and removing the receiving surface from the sample vacuum chamber, and transferring the sample holder from the sample vacuum chamber to a storage container or cryo-EM instrument.

* * * * *